United States Patent [19]

Opower et al.

[11] Patent Number: 4,553,242
[45] Date of Patent: Nov. 12, 1985

[54] GAS LASER

[75] Inventors: Hans Opower, Krailling; Volker Ernst, Neu-Esting, both of Fed. Rep. of Germany

[73] Assignee: W.C. Heraeus GmbH, Hanau, Fed. Rep. of Germany

[21] Appl. No.: 602,121

[22] Filed: Apr. 19, 1984

[30] Foreign Application Priority Data

May 7, 1983 [DE] Fed. Rep. of Germany ....... 3316778
Nov. 2, 1983 [DE] Fed. Rep. of Germany ....... 3339574

[51] Int. Cl.$^4$ .............................................. H01S 3/097
[52] U.S. Cl. ........................................ 372/87; 372/26; 372/35; 372/61; 372/82
[58] Field of Search .................. 372/87, 61, 35, 82, 372/26, 28

[56] References Cited

FOREIGN PATENT DOCUMENTS 2919708 10/1981 Fed. Rep. of Germany ........ 372/87

Primary Examiner—William L. Sikes
Assistant Examiner—Léon Scott, Jr.
Attorney, Agent, or Firm—Felfe & Lynch

[57] ABSTRACT

A gas laser of circular cross section perpendicular to the direction of beam propagation and having an optical resonator is disclosed. The laser has, for continuous or modulated continuous beam operation, a metal tube as inside conductor, which is connected to a high-frequency voltage source. An outside conductor, which is coaxial with the inside conductor consists of a tube of metal of good electrical conductivity. The inside conductor is surrounded, leaving an intervening space, by a jacket tube of dielectric or metallic material. A dielectric cooling liquid of electrical insulating quality and low loss factor for high-frequency fields flows through the space between the inside conductor and the jacket tube.

18 Claims, 2 Drawing Figures

GAS LASER

BACKGROUND OF THE INVENTION

The invention relates to an electrically excited gas laser having an optical resonator which has an inside conductor surrounded by a cylindrically symmetrical outside conductor. The free space between the inside conductor and the outside conductor forms the excitation chamber in which an electrical discharge takes place between the outside conductor and conducting wires at ground potential surrounding with space the inside conductor.

Gas lasers of the above-described construction are known in the form of pulsed carbon dioxide lasers from German Pat. No. 2,919,708. This construction is characterized by an especially compact accommodation of the excitation chamber.

SUMMARY OF THE INVENTION

It is the object of the invention to modify and improve the known, proven laser design in order to provide for continuous or modulated continuous beam operation and reliably manage any cooling problems that might arise, so that such problems will be solved in a manner compatible with the electrical conditions.

This object is accomplished in an electrically excited laser of the kind defined above by the fact that, for continuous or modulated continuous beam operation, the inside conductor is in the form of a metal tube and is connected to a high-frequency voltage source and the outside conductor consists of a tube of metal of good electrical conductivity which is disposed coaxially to the inside conductor. The inside conductor is surrounded by a jacket tube with an intervening space. An electrical insulating dielectric cooling liquid of low loss factor (i.e. tangent delta smaller than $10^{-2}$) for high-frequency fields flows through the intervening space.

It has been found desirable to make the jacket tube one which is closed at one end, and to make the cooling liquid flow in through the inside conductor and out through the intervening space between the inside conductor and jacket tube. This has the advantage that the terminals for the inflow and outflow of the cooling liquid can be mounted on one end face of the laser, and this permits the beam emergence end of the laser to be kept completely free.

The material of the jacket tube can be a dielectric material, such as aluminum oxide, for example. The coupling of the high-frequency electrical fields with the excitation chamber is capacitive. In the discharging state, the jacket tube of dielectric material, such as aluminum oxide, and the dielectric cooling liquid together form the dielectric of the coupling capacitor whose size determines the modulation. It is therefore especially important that the cooling liquid be capable not only of effectively insulating electrical fields of several thousand volts but also that it have very low losses, i.e., tangent delta smaller than $10^{-2}$ for high-frequency fields of the order of a few hundred kilo-$H_z$ to hundred mega-$H_z$. Oils on the basis of fluorocarbon compounds, such as for example the product sold under the trademark name "Flutec PP3" by Kali Chemie AG, have proven to be especially good cooling liquids. Distilled water can also be used as cooling liquid.

An especially good removal of heat is achieved if the jacket tube consists of metal. The metal jacket tube is mounted so as to be electrically insulated from the outside conductor and is connected conductively to the inside conductor. This design has proven useful for lasers in which the input high frequency amounts to more than 1 MHz. The coupling of the high-frequency electrical fields to the excitation chamber is performed with the use of special matching circuits such as those formed of parallel and serially connected capacitances and inductances. In this case, too, the cooling liquids mentioned above have also proven practical.

The jacket tube can consist of a two-layer or multi-layer material. Jacket tubes of a basic material of copper, aluminum or steel externally coated with silver or platinum have proven practical.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

DESCRIPTION OF THE PREFERRED EMBODIMENTS

Figure 1:
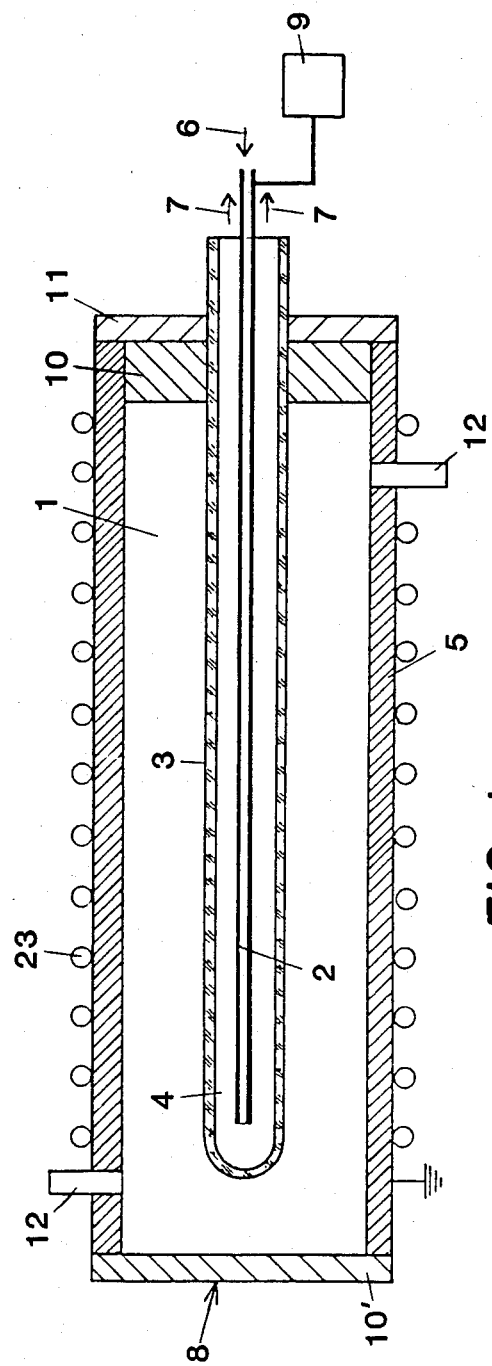
FIG. 1 diagrammatically shows a gas laser with a jacket tube of dielectric material.

In FIG. 1, reference numeral 1 indicates the excitation chamber. The reference number 2 is associated with the inside conductor in the form of a metal tube which is surrounded, with an intervening space 4, by the jacket tube 3 of dielectric material which is closed at one end. The laser is preferably circular in cross section perpendicular to the direction of propagation but other geometries may be employed. The excitation chamber 1 is externally defined by the outside conductor 5, which consists, for example, of a copper tube, and is at ground potential. In the embodiment, the cooling liquid, as indicated by the arrow 6, flows through the inside conductor 2; and then through the space 4, as indicated by the arrows 7. This design assures a completely free beam emergence end 8 of the laser. The coolant temperature should be as low as possible, and should not exceed ca. 20° C. Preferably, it is just above the dew point prevailing at the time.

The inside conductor 2 is conductively connected to the high-frequency voltage source 9. The optical mirrors defining the excitation chamber are identified as 10 and 10', the mirror 10' in this embodiment hermetically sealing the excitation chamber 1. The hermetic seal of the excitation chamber 1 on the end at which the mirror 10 is situated is provided by the metal disk 11. Gas is circulated through the excitation chamber 1 through the connections 12. The outside conductor 5 is cooled by the cooling coil 23. Other cooling systems can be used instead of the cooling coil 23.

Figure 2:
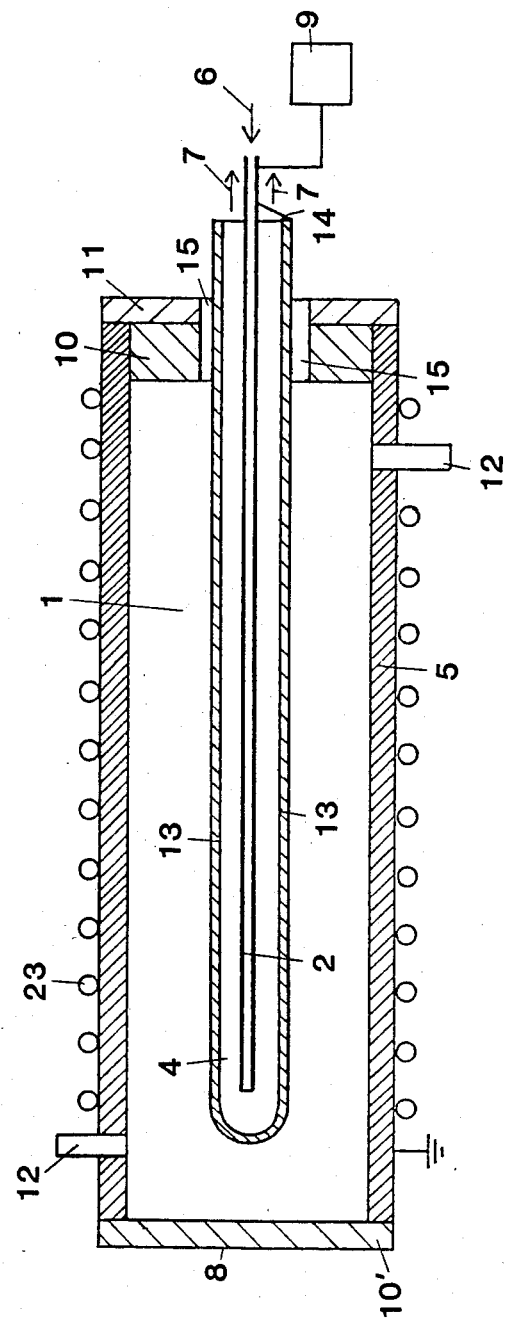
FIG. 2 diagrammatically shows a gas laser with a jacket tube of metal.

In FIG. 2, reference numeral 1 indicates the excitation chamber. The reference number 2 is associated with the inside conductor consisting of a metal tube, which is surrounded, with an intervening space 4, by the metal jacket tube 13, of copper for example, which is closed at one end. The excitation chamber 1 is externally defined by the metal tube 5 which is coaxial with the inside conductor and which serves as an outside conductor at ground potential. The metal tube 5 can also consist of a copper tube. In the embodiment, the cooling liquid, as indicated by the arrow 6, is fed to the inside conductor, and flows out through the intervening space 4, as indicated by arrows 7. This design assures a completely free beam emergence end 8 of the laser. The inside conductor 2 and the jacket tube 13 are connected together electrically by the connection 14. The inside conductor 2 is connected to the high-frequency voltage source 9, which supplies, for example, a high-frequency voltage at 27 MHz. 10 and 10' indicate the optical mirrors at the ends of the excitation chamber, the mirror 10' in this embodiment hermetically sealing the excitation chamber. The hermetic sealing of the excitation chamber 1 at the end at which the mirror 10 is located is accomplished by the cover 11 in which the jacket tube 13 is mounted and insulated from the grounded outside conductor 5 by the electrical insulation 15. The laser gas is fed through the excitation chamber 1 through the connections 12. The outside conductor 5 is cooled by the cooling coil 23. Other cooling systems can also serve instead of a cooling coil 23.

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

We claim:

1. An electrically excited gas laser having an optical resonator, the laser comprising an inside conductor in the form of a metal tube connected to a high-frequency voltage source, the inside conductor being surrounded, with a first intervening space, by a symmetrical outside conductor that is at ground potential, the first intervening space between the inside and outside conductors forming an excitation chamber in which an electrical discharge takes place between the inside and outside conductors, wherein the outside conductor consists of a tube of electrical conductive material and is coaxially disposed with the inside conductor which in turn is surrounded, by a spaced jacket tube to form a second intervening space, and a dielectric cooling liquid of electrical insulating quality and low loss factor for high-frequency fields flowing through the second intervening space for continuous or modulated continuous beam operation of the laser.

2. The gas laser of claim 1, wherein the jacket tube is sealed at one end and the cooling liquid flows in and out through the inside conductor.

3. The gas laser of claim 1, wherein the cooling liquid is a fluorocarbon compound or distilled water.

4. The gas laser of claim 1, wherein the jacket tube is a dielectric material.

5. The gas laser of claim 4, wherein the jacket tube is aluminum oxide.

6. The gas laser of claim 1, wherein the jacket tube is metal, is electrically insulated from the outside conductor and conductively connected to the inside conductor.

7. The gas laser of claim 6, wherein the jacket tube is copper.

8. The gas laser of claim 6, wherein the jacket tube is of at least two layers.

9. The gas laser of claim 8, wherein the jacket tube comprises a ground material of copper or aluminum and steel, which is externally coated with silver or platinum.

10. The gas laser of claim 1, wherein the outside conductor is cooled.

11. The gas laser of claim 1, having a circular cross section perpendicular to the direction of beam propagation.

12. The gas laser of claim 11, wherein the symmetrical outside conductor is cylindrical.

13. The gas laser of claim 12, wherein the outside conductor is metal.

14. The gas laser of claim 13, wherein the jacket tube is of a dielectric material.

15. The gas laser of claim 13, wherein the jacket tube is of copper.

16. The gas laser of claim 13, wherein the jacket tube is of at least two or more layers.

17. The gas laser of claim 13, wherein the jacket tube is sealed at one end and the cooling liquid consists of a fluorocarbon compound or distilled water.

18. The gas laser of claim 1, wherein the outside conductor is metal.

* * * * *